Figure 1:
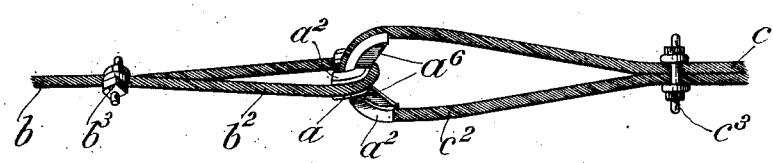

P. B. McCAGHEY.
MEANS FOR COUPLING DERRICK GUYS AND THE LIKE.
APPLICATION FILED APR. 12, 1910. RENEWED NOV. 7, 1912.

1,047,965.   Patented Dec. 24, 1912.

Witnesses:
C. E. Mulreany
B. M. Ryerson

Inventor
Peter B. McCaghey.
By his Attorneys
Edgar Tate & Co.

COLUMBIA PLANOGRAPH CO., WASHINGTON, D. C.

UNITED STATES PATENT OFFICE.

PETER B. McCAGHEY, OF LITTLE FALLS, NEW YORK.

MEANS FOR COUPLING DERRICK-GUYS AND THE LIKE.

1,047,965.  Specification of Letters Patent. Patented Dec. 24, 1912.

Application filed April 12, 1910, Serial No. 555,020. Renewed November 7, 1912. Serial No. 730,109.

*To all whom it may concern:*

Be it known that I, PETER B. McCAGHEY, a citizen of the United States, and residing at Little Falls, in the county of Herkimer and State of New York, have invented certain new and useful Improvements in Means for Coupling Derrick-Guys and the Like, of which the following is a specification, such as will enable those skilled in the art to which it appertains to make and use the same.

This invention relates to devices for use in coupling derrick guys, and cables of various description and especially wire cables or guys; and the object thereof is to provide an improved device of this class having a large radius which will prevent the cracking or kinking of the guys or cables, and also prevent the loops of the separate guys or cables, where coupled or connected, from coming in contact, thus avoiding the wear of the strands composing the guys or cables, and the liability of the separation of such strands and the danger and expense caused thereby; and with these and other objects in view the invention consists in a device of the class specified, constructed as hereinafter described and claimed.

The invention is fully disclosed in the following specification, of which the accompanying drawing forms a part, in which the separate parts of my improvement are designated by suitable reference characters in each of the views, and in which:—

Figure 2:
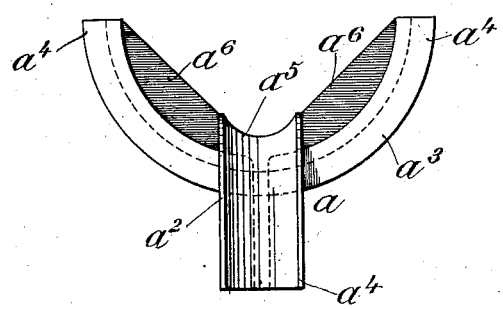

Figure 1 is a view showing the method of using my improved cable coupling device; Fig. 2 a side view of the coupling device detached, and;—Fig. 3 a plan view of the device as shown in Fig. 2.

Figure 3:
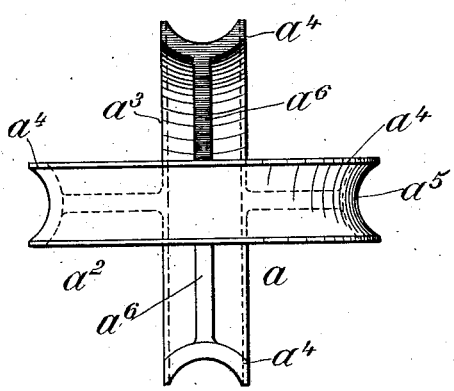

In the practice of my invention I provide a coupling device of the class specified, which is shown at $a$, in use, in Fig. 1 and detached in Figs. 2 and 3, and said device consists of two semi-circular or segmentally formed parts $a^2$ and $a^3$, which are integrally connected and cross each other at right angles, the ends $a^4$ of one part projecting in a direction opposite to that of the ends $a^4$ of the other part.

The convex surfaces of the parts $a^2$ and $a^3$ are provided with deep grooves $a^5$, and the concave or inner surfaces thereof are provided, in the form of construction shown, with radial ribs $a^6$ which extend from the ends $a^4$ of each of the parts of the device to the groove $a^5$ or the edges thereof in the other part of the device. The ribs $a^6$ enable the device to be made lighter or of less metal than would otherwise be necessary and also serve as guides to hold the cables or the end loops thereof in the grooves $a^5$.

In Fig. 1 I have shown two cables $b$ and $c$ coupled or connected and the use of my improved cable coupling device in connection therewith. In this operation it is customary to form the ends of the cables into loops $b^2$ and $c^2$ which are interlocked in the operation of forming said loops, and in practice my improved coupling device is employed as shown in Fig. 1, the end portions of the cables being passed around the parts $a^2$ and $a^3$ of the coupling device in the operation of forming said loops and said end portions of the cables being secured to the main parts thereof at $b^3$ and $c^3$ in the usual or any preferred manner. With this construction the cables or the loops $b^2$ and $c^2$ thereof do not come together and there is no friction between said cables, the only friction being between the cables and the parts $a^2$ and $a^3$ of the coupling device, and the formation of said coupling device is such that there is no short bend in the cables or in the loops $b^2$ and $c^2$, and the friction occasioned by the use of said cables is reduced to a minimum.

My improved coupling device may be of any desired dimensions according to the size of the cables to be coupled, and the convex curve of the separate parts $a^2$ and $a^3$ of the coupling device may be formed on any desired radius.

Having fully described my invention, what I claim as new, and desire to secure by Letters Patent, is:—

1. A coupling device of the class described, composed of two segmentally curved parts integrally connected and crossing each other at right angles, the end portions of one part extending in a direction opposite to that in which the end portions of the other part extend, and the convex surfaces of said parts being provided with grooves.

2. A coupling device of the class described, comprising two integrally curved parts, which cross each other at right angles, the end portions of one part extending in a direction opposite to that in which the end portions of the other part extend, the convex surfaces of said parts being provided with grooves.

3. A coupling device of the class described, comprising two curved parts, which cross each other at right angles, the end portions of one part extending in a direction opposite to that in which the end portions of the other part extend, the convex surfaces of said parts being provided with grooves, and the concave surfaces of each part being provided with ribs which extend from the ends thereof to the edges of the groove in the outer part.

In testimony that I claim the foregoing as my invention I have signed my name in presence of the subscribing witnesses this 7th day of April 1910.

PETER B. McCAGHEY.

Witnesses:
GEORGE J. O'CONNOR,
WINIFRED A. WALSH.

Copies of this patent may be obtained for five cents each, by addressing the "Commissioner of Patents, Washington, D. C."